US008380792B2

(12) United States Patent
Boss et al.

(10) Patent No.: US 8,380,792 B2
(45) Date of Patent: Feb. 19, 2013

(54) SESSION MANAGEMENT ENHANCEMENTS FOR INSTANT MESSAGING APPLICATIONS

(75) Inventors: Gregory Jensen Boss, American Fork, UT (US); Rick Allen Hamilton, II, Charlottesville, VA (US); Aroopratan D. Pandya, Hopewell Junction, NY (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 12/177,284

(22) Filed: Jul. 22, 2008

(65) Prior Publication Data

US 2008/0281933 A1 Nov. 13, 2008

Related U.S. Application Data

(63) Continuation of application No. 11/146,989, filed on Jun. 6, 2005, now abandoned.

(51) Int. Cl.
*G06F 15/16* (2006.01)
(52) U.S. Cl. ........................................ 709/206
(58) Field of Classification Search .............. 709/206, 709/207; 715/751, 753, 758, 759
See application file for complete search history.

(56) References Cited

U.S. PATENT DOCUMENTS

| | | | | |
|---|---|---|---|---|
| 6,301,609 B1 | 10/2001 | Aravamudan et al. | ........ | 709/207 |
| 6,651,086 B1 | 11/2003 | Manber et al. | ................ | 709/205 |
| 6,731,308 B1 * | 5/2004 | Tang et al. | .................... | 715/751 |
| 6,760,580 B2 | 7/2004 | Robinson et al. | .......... | 455/412.2 |
| 7,281,215 B1 * | 10/2007 | Canfield et al. | .............. | 715/752 |
| 7,356,567 B2 | 4/2008 | Odell et al. | | |
| 7,412,491 B2 | 8/2008 | Gusler et al. | | |
| 7,433,920 B2 * | 10/2008 | Blagsvedt et al. | ............ | 709/204 |
| 7,454,709 B1 * | 11/2008 | Appelman | ..................... | 715/733 |
| 2002/0035605 A1 | 3/2002 | McDowell et al. | ........... | 709/206 |
| 2002/0178227 A1 | 11/2002 | Matsa et al. | .................. | 709/206 |
| 2002/0178231 A1 | 11/2002 | Matsa et al. | .................. | 709/206 |
| 2003/0002441 A1 | 1/2003 | Banerjee et al. | | |
| 2003/0142654 A1 * | 7/2003 | Chambers et al. | ............ | 370/338 |
| 2003/0204720 A1 | 10/2003 | Schoen et al. | ................ | 713/153 |
| 2004/0103318 A1 | 5/2004 | Miller et al. | | |
| 2004/0111479 A1 | 6/2004 | Borden et al. | | |
| 2004/0199594 A1 | 10/2004 | Radatti et al. | | |
| 2004/0205775 A1 * | 10/2004 | Heikes et al. | ................. | 719/318 |
| 2004/0254998 A1 | 12/2004 | Horvitz | ........................ | 709/206 |
| 2005/0080848 A1 * | 4/2005 | Shah | ............................ | 709/204 |
| 2005/0091253 A1 * | 4/2005 | Cragun et al. | ................ | 707/102 |
| 2005/0149620 A1 | 7/2005 | Kirkland et al. | | |
| 2006/0059235 A1 | 3/2006 | Peterson et al. | | |
| 2006/0062203 A1 | 3/2006 | Satapati | | |
| 2006/0075029 A1 | 4/2006 | Kelso et al. | | |
| 2006/0168048 A1 | 7/2006 | Lyle et al. | | |
| 2006/0168065 A1 | 7/2006 | Martin | | |
| 2006/0212519 A1 | 9/2006 | Kelley et al. | | |
| 2006/0235932 A1 | 10/2006 | Celi, Jr. et al. | | |
| 2006/0253895 A1 | 11/2006 | Brandofino et al. | | |
| 2008/0092063 A1 * | 4/2008 | Canfield et al. | ............... | 715/753 |
| 2008/0183832 A1 | 7/2008 | Kirkland et al. | | |
| 2008/0184366 A1 | 7/2008 | Alperovitch et al. | | |
| 2008/0189374 A1 | 8/2008 | Odell et al. | | |
| 2008/0250336 A1 | 10/2008 | Gusler et al. | | |

* cited by examiner

*Primary Examiner* — Ryan Jakovac
(74) *Attorney, Agent, or Firm* — Yee & Associates, P.C.; Arthur J. Samodovitz

(57) ABSTRACT

A computer displays a first identifier of a remote user followed by a first numeral and a second numeral in an interface of a messaging program for a local user, the first numeral representing a number of active messaging sessions for the remote user, and the second numeral representing a number of messages present in a queue and to be delivered to the remote user.

19 Claims, 3 Drawing Sheets

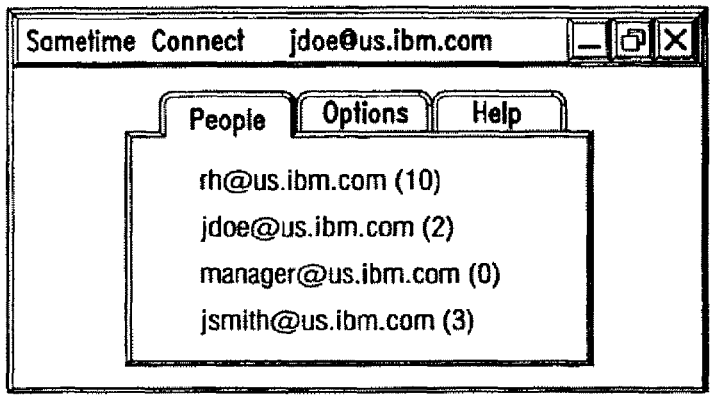
FIG. 4
FIG. 5
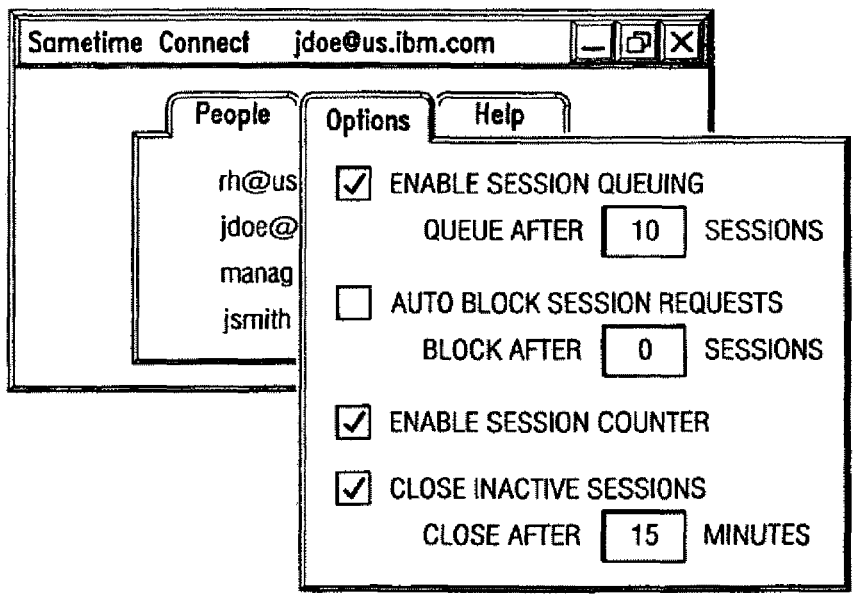
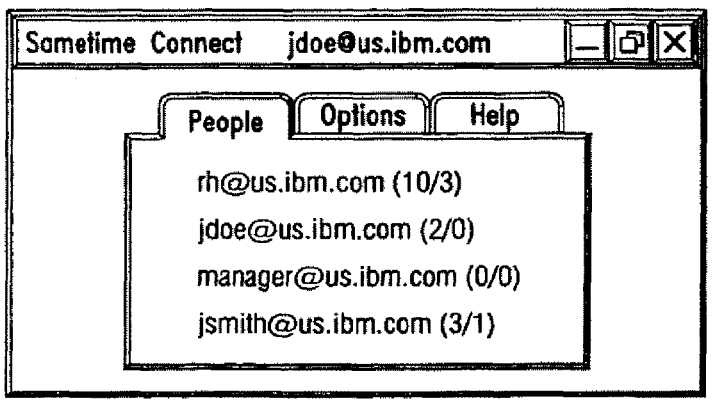
FIG. 7

SESSION MANAGEMENT ENHANCEMENTS FOR INSTANT MESSAGING APPLICATIONS

CROSS-REFERENCE TO RELATED APPLICATION(S)

This application is a continuation application of co-pending U.S. utility patent application entitled "Session Management Enhancements for Instant Messaging Applications" filed on Jun. 6, 2005 and accorded Ser. No. 11/146,989, now abandoned and claims priority therefrom.

FIELD OF THE INVENTION

The present invention is a process for using electrical computers or digital processing systems to transfer data via one or more communications media. In particular, the present invention comprises an improved demand-based messaging system that enables a message recipient to manage messaging sessions.

BACKGROUND OF THE INVENTION

Demand-based messaging is a communication service that allows people to exchange message data, such as text, over a network or other communications media, in real time. Probably the most common medium for exchange is the Internet, but as wireless phone networks continue to expand, their popularity for text messaging is also expanding. U.S. Pat. No. 6,301,609 issued to Aravamudun et al., and U.S. Patent Publications Nos. 2002/0035605 and 2004/0254998, for example, illustrate the move toward an exchange medium that unifies traditional and wireless communications. Instant messaging (1M) is perhaps the most widely known and used embodiment of demand-based messaging. Today, most network and online service providers offer some form of IM service. According to some estimates, the top three instant messaging service providers serve over forty million users. Instant messaging services also are being rapidly deployed and integrated into enterprise infrastructure. International Business Machines, Inc. (IBM), for example, has deployed LOTUS SAMETIME instant messaging applications for employees world-wide. Other examples of IM applications that are popular today include MSN Messenger and Yahoo/AOL Instant Messenger. Web-based interfaces are also gaining popularity, as illustrated in U.S. Pat. No. 6,651,086 issued to Manber et al., which describes how a user can join conversations about topics that are presented as web content.

IM users typically use a networked computer and an IM client program to exchange messages with one another in conversational style. An IM client provides an interface for users to compose, send, receive, and read messages. In a graphical display, an IM client usually includes at least two windows: a window for composing and sending messages, and a window for displaying messages as users take turns sending and receiving them. IM sessions (colloquially referred to as "chats") are often lengthy, with multiple participants each taking many turns "speaking" in the chat window. It is common for one user to have multiple IM chats running simultaneously, usually in separate windows.

Demand-based messaging services, including instant messaging services, no doubt owe much of their success to the convenience and efficiency with which communications can be exchanged. Unfortunately, the popularity of such messaging services directly affects the convenience and efficiency with which users can exchange communications, even making such communications disruptive at times. For example, it is not uncommon for users to have important instant messaging sessions active with one or more users, while other users continue to interrupt the flow of communications with unrelated messages.

Current messaging applications provide minimal configuration and control to a user, often including only rudimentary means for blocking individual users from initiating a messaging session. With such limited means for managing the exchange of communications, any given messaging user is available to some sub-set of other users. Thus, existing messaging applications remain too cumbersome to manage communications effectively and there remains a need to advance the state of the art of demand-based messaging to overcome these shortcomings.

SUMMARY OF THE INVENTION

The invention comprises an improved demand-based messaging system that enables a user to effectively manage multiple messaging sessions.

The messaging system comprises a messaging program operable on a plurality of electrical computers or data processing machines connected by one or more communications media. The messaging program comprises a conventional message composer program, a conventional message transport program, a conventional message reader program, and an inventive, user-configurable, policy-driven session management program.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4 illustrates a hypothetical interface to the messaging program of the present invention;

FIG. 5 is an exemplary interface, in which controls for the present invention are integrated into a conventional interface for selecting options;

FIG. 7 illustrates an alternative embodiment of the hypothetical interface to the messaging program of the present invention.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "messaging program."

Figure 1:
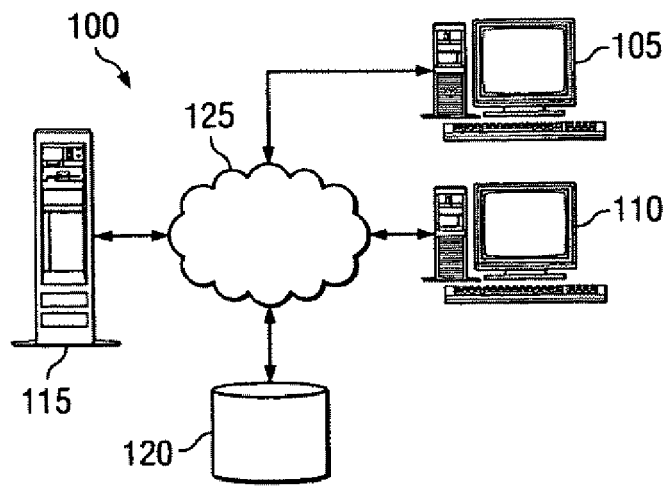
FIG. 1 represents an exemplary network of hardware devices.

Additionally, the messaging program is described below with reference to an exemplary network of hardware devices, as depicted in FIG. 1, through which the messaging program can transfer data from one user to another. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125

Figure 2:
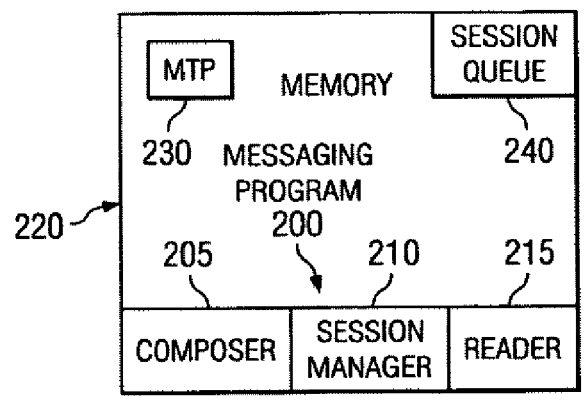
FIG. 2 is a schematic of a memory having the components of the present invention stored therein.

Messaging program 200 and its components, composer 205, session manager 210, and reader 215 typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media and network nodes. Thus, FIG. 2 is included merely as a descriptive expedient and does not necessarily reflect any particular physical embodiment of memory 220. As depicted in FIG. 2, though, memory 220 may include additional data and programs. Of particular import to messaging program 200, memory 220 may include message transfer program (MTP) 230 and session queue 240, with which messaging program 200 interacts.

Figure 3:
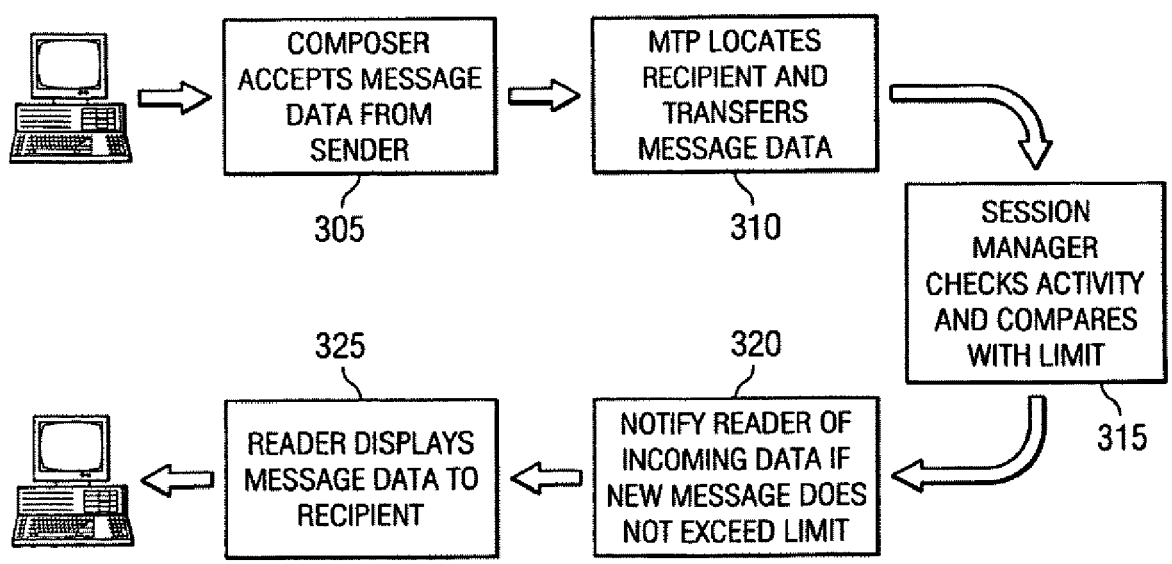
FIG. 3 provides a functional overview of the messaging program of the present invention, as it interacts with a first user sending a message to a second user over a network of hardware devices.

FIG. 3 provides a functional overview of messaging program 200, as it interacts with a first user sending a message to a second user over a computer network. Inasmuch as the following discussion largely addresses the features of messaging program 200 from a recipient's perspective, a message recipient (the second user in the example of FIG. 3) is referred to as the "local user." A user that initiates a message is referred to as the "remote user." Messaging program 200 is loaded into the memory of both users' computers. Composer 205 accepts message data from the remote user (305), and then, upon the remote user's request, MTP 230 locates the local user's computer on the network and transfers the message data to the local user's computer (310). Session manager 210 on the local user's computer then examines the local user's current activity and the local user's activity policy (315). In general, the local user's activity comprises the number of messaging sessions in which the local user is presently "active," while the local user's activity policy indicates the threshold of activity at which session manager 210 should intervene to control the flow of messages or message notices to reader 215. The term "active" in this context is inherently subjective, and session manager 210 can be configured to recognize active sessions based upon context or a user's preference. Thus, while there are many ways to define an "active" session, a specific definition is not material to the inventive features of messaging program 200. Referring again to FIG. 3 for illustration, if the local user's activity policy permits, session manager 210 notifies reader 215 of incoming message data (320), and reader 215 displays the incoming message data to the local user (325). Alternatively, MTP 230 transfers the message data to a messaging server (such as server computer 115), and MTP 230 on the local user's computer retrieves the message data from the messaging server. Those skilled in the art will appreciate that many similar functional variations are possible and not all are described here.

As briefly described above, session manager 210 is driven by a user-configurable activity policy that reflects a local user's preferences for accepting new message data while actively engaged in other messaging sessions. Thus, an activity policy is a flexible concept in which many variations of the policies described in detail here are possible. In the preferred embodiment, though, session manager 210 implements high-level functions in the following configurable policies: a "courtesy" policy, a "blocking" policy, a "queuing" policy, and an "inactive session" policy. The functions of each policy are described in more detail in the following discussion.

If the courtesy policy is applied, session manager 210 broadcasts the number of sessions that the local user has active at any given time, so that other instances of messaging program 200 running on remote computers can display this number to remote users. Thus, the courtesy policy causes session manager 210 to provide information to remote users, but relies upon the remote users to exercise their own personal judgment regarding the propriety of requesting a session with someone that already has multiple active sessions. FIG. 4 illustrates a hypothetical interface to session manager 210 in which the courtesy policy has been applied, where the parenthetical number next to each user's identity indicates the number of sessions that the user has active. The hypothetical interface of FIG. 4 is representative of both a local user's and a remote user's interface, depending upon context.

The blocking policy configures session manager 210 to block new message data if the number of active sessions exceeds an "activity limit," or if the request is from a remote user identified in a "block list." The activity limit represents the maximum number of sessions that can be active at any given time, while the block list identifies specific remote users whose requests should be denied at any given time. Both the activity limit and the block list are user-configurable parameters. The local user may configure these parameters through a graphical interface, in which case session manager 210 stores the parameters in a configuration file, or the local user may edit the configuration file directly. FIG. 5 is an exemplary interface, in which controls for the parameters described herein are integrated into a conventional interface for selecting options. Many other techniques for configuring and storing parameters are well-known in the art, and the particular technique applied is not material to the inventive features of messaging program 200. Referring again to FIG. 4 for illustration, if the user identified as "rh@us.ibm.com" is the local user and has set the activity limit to 10 active sessions, any new message data from the remote user (identified as "jdoe@us.ibm.com" in this example) would be blocked until at least one of the local user's current sessions ends or becomes inactive. Session manager 210 optionally notifies the remote user that the request was blocked based upon the local user's number of active sessions.

Figure 6:
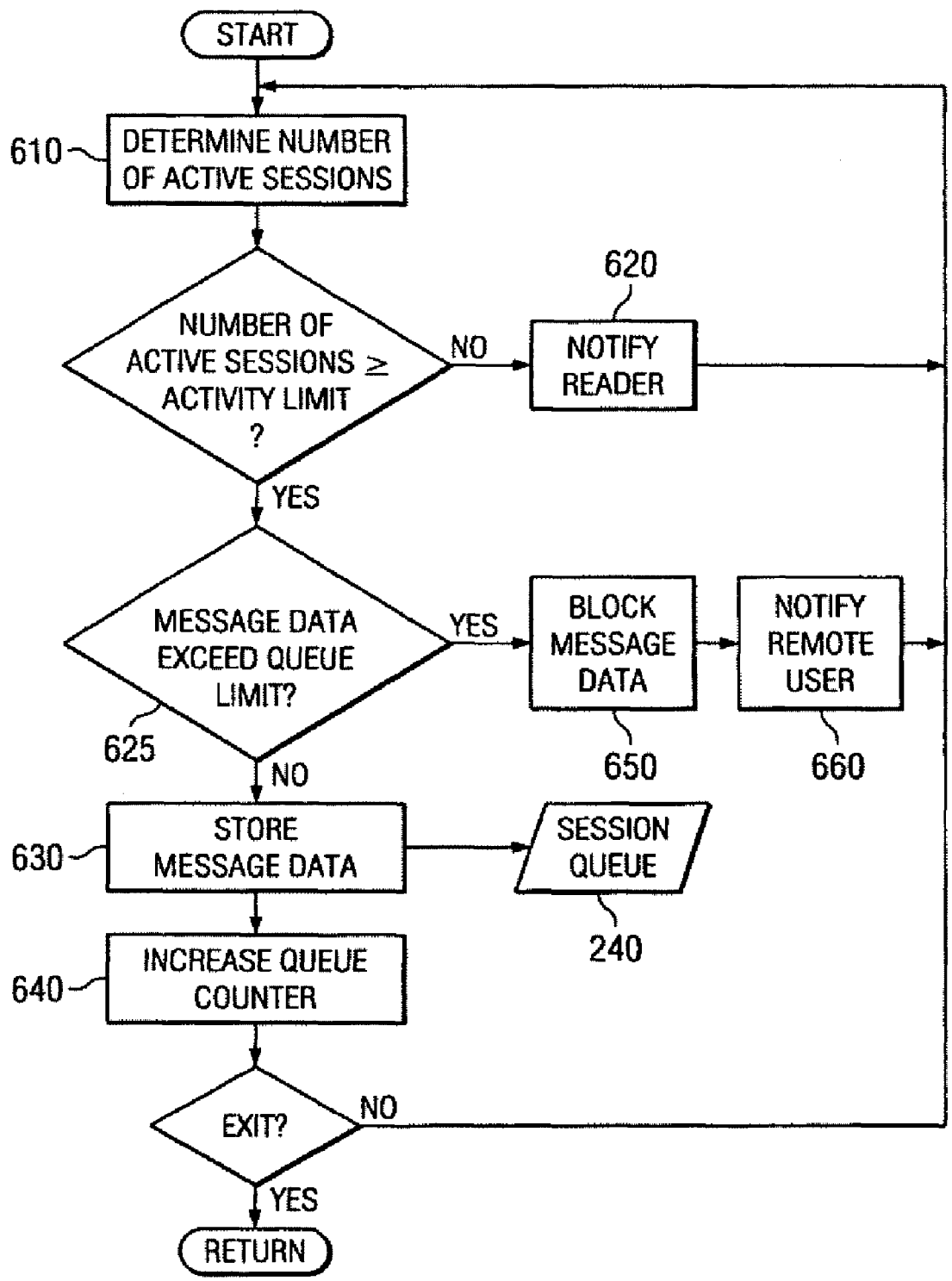
FIG. 6 is a flowchart of the present invention as it implements a queuing policy.

The queuing policy extends the blocking policy so that session manager 210 stores new message data in session queue 240, rather than blocking the new message data, if the number of active sessions exceeds the activity limit. FIG. 6 is a flowchart of session manager 210 as it implements a queuing policy. The maximum size of session queue 240, and thus the number of new messages that session manager 210 can store therein, is a user-configurable parameter, referred to herein as the "queue limit." Thus, with the queuing policy applied, session manager 210 first determines the number of active sessions (610). If the number of active sessions does not exceed the activity limit, then messaging program 200 proceeds in a conventional manner and notifies reader 215 that new message data has been received (620). If the number of active sessions has reached the activity limit, then session manager 210 determines if the new message data would exceed the queue limit (625). If the new message data does not exceed the queue limit, session manager 210 stores the new message data (630) in session queue 240 and increments a queued message counter (640), but does not notify reader 215. But if the new message data does exceed the queue limit, then session manager 210 blocks the message data (650) and, optionally, notifies the remote user (660) that the message data has been blocked because of activity limits. When an active session ends or becomes inactive, session manager 210 decreases the queued session counter and notifies reader 215 that the new message data is ready to be retrieved from session queue 240. Reader 215 then removes the new message data from session queue 240 and processes the new message data in a conventional manner that is familiar to those skilled in the art.

Interfaces to messaging program 200, such as the interface illustrated in FIG. 4, may be modified to display queue status data, such as the queued message counter and a given user's position within a queue. FIG. 7 illustrates an exemplary modified interface for a user identified as jdoe@us.ibm.com. In FIG. 7, queue status data is displayed for some subset of users selected by jdoe@us.ibm.com, and the meaning of the parenthetical numbers depends upon context. For example, if jdoe@us.ibm.com is a remote user and sends message data to local user rh@us.ibm.com, then the parenthetical information on display of FIG. 7 would indicate that local user rh@us.ibm.com has 10 active sessions and that jdoe@us.ibm.com's request is the third in the local user's queue. If jdoe@us.ibm.com has not sent any messages to rh@us.ibm.com, then the parenthetical information next to rh@us.ibm.com indicates that rh@us.ibm.com has 10 active sessions and a total of three messages in the queue. In yet another context the parenthetical information next to jdoe@us.ibm.com indicates that jdoe@us.ibm.com has two active sessions and no messages waiting in the queue. Additionally, if either user places a mouse cursor over the number, or takes some other appropriate triggering action, messaging program 200 would display the identities of the active users, the queued users, or both.

The inactive session policy allows a user to configure an "inactive" session parameter that defines an inactive session in terms of a period of time in which no messages are exchanged with a given remote user. A user also can configure an inactive session policy so that messaging program 200 takes user-selected action when a session is identified as inactive, such as archiving the session messages and closing the session interface.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method to manage multiple messaging sessions, the method comprising the steps of:
    a computer displaying a first identifier of a remote user followed by a first numeral and a second numeral for a local user, wherein the first numeral represents a number of active messaging sessions for the remote user;
    wherein, if the local user has not sent a message to the remote user, the second numeral represents a number of messages to be delivered to the remote user and that are present in a queue used by the remote user; and
    wherein, if the local user has sent a message to the remote user and the message is present in the queue, the second numeral represents a position in the queue of the message sent by the local user.

2. The method of claim of claim 1 further comprising the steps of:
    the computer receiving a message having a second identifier of a remote user in a messaging session; and
    the computer determining that the second identifier matches a third identifier in a list of, and in response, the computer rejecting the message having the second identifier.

3. The method of claim 1 further comprising the steps of:
    the computer receiving a message from the remote user in a messaging session;
    the computer determining a number of active messaging sessions for the local user;
    the computer blocking, responsive to the number of active messaging sessions for the local user being equal to or greater than a pre-designated number, the message from the remote user; and
    the computer sending data comprising the number of active messaging sessions for the local user and a number of messages present in a queue used by the local user and waiting to be delivered to the local user.

4. The method of claim 1 further comprising the steps of:
    the computer receiving a message to the local user in a messaging session;
    the computer determining a number of active messaging sessions for the local user; and
    the computer displaying, responsive to the number of active messaging sessions for the local user being less than a pre-designated number, the message to the local user.

5. The method of claim 1 further comprising the steps of:
    the computer displaying an interface configured to activate a session counter, to receive a session number, to receive a block number, and to receive an inactive number;
    the computer queuing, responsive to a first incoming session causing a first count number to equal or exceed the session number, the first incoming session;
    the computer blocking, responsive to a second incoming session causing a second count number to equal or exceed the block number, the second incoming session; and the computer closing, responsive to determining that an elapsed period of time equals or exceeds the inactive number, a session associated with the elapsed period of time.

6. A computer system for managing multiple messaging sessions, the computer system comprising:
one or more processors, one or more computer-readable memories, and one or more computer-readable, tangible storage devices; and
program instructions, stored on the one or more computer-readable, tangible storage devices for execution by at least one of the one or more processors via the at least one of the one or more memories, to display a first identifier of a remote user followed by a first numeral and a second numeral for a local user, wherein the first numeral represents a number of active messaging sessions for the remote user;
wherein, if the local user has not sent a message to the remote user, the second numeral represents a number of messages to be delivered to the remote user and that are present in a queue used by the remote user;
wherein, if the local user has sent a message to the remote user and the message is present in the queue, the second numeral represents a position in the queue of the message sent by the local user.

7. The computer system of claim 6 further comprising:
program instructions, stored on the one or more computer-readable, tangible storage devices for execution by at least one of the one or more processors via the at least one of the one or more memories, to receive a message having a second identifier of a remote user in a messaging session; and
program instructions, stored on the one or more computer-readable, tangible storage devices for execution by at least one of the one or more processors via the at least one of the one or more memories, to reject, responsive to determining that the first identifier matches a third identifier in a list, the message having the second identifier.

8. The computer system of claim 6 further comprising:
program instructions, stored on the one or more computer-readable, tangible storage devices for execution by at least one of the one or more processors via the at least one of the one or more memories, to receive a message from the remote user in a messaging session;
program instructions, stored on the one or more computer-readable, tangible storage devices for execution by at least one of the one or more processors via the at least one of the one or more memories, to determine a number of active messaging sessions for the local user;
program instructions, stored on the one or more computer-readable, tangible storage devices for execution by at least one of the one or more processors via the at least one of the one or more memories, to block, responsive to the number of active messaging sessions for the local user being equal to or greater than a pre-designated number, the message from the remote user; and
program instructions, stored on the one or more computer-readable, tangible storage devices for execution by at least one of the one or more processors via the at least one of the one or more memories, to send data comprising the number of active messaging sessions for the local user and a number of messages present in a queue used by the local user and waiting to be delivered to the local user.

9. The computer system of claim 6 further comprising:
program instructions, stored on the one or more computer-readable, tangible storage devices for execution by at least one of the one or more processors via the at least one of the one or more memories, to receive a message to local user in a messaging session;
program instructions, stored on the one or more computer-readable, tangible storage devices for execution by at least one of the one or more processors via the at least one of the one or more memories, to determine a number of active messaging sessions for the local user; and
program instructions, stored on the one or more computer-readable, tangible storage devices for execution by at least one of the one or more processors via the at least one of the one or more memories, to display, responsive to the number of active messaging sessions for the local user being less than a pre-designated number, the message to the local user.

10. The computer system of claim 6 further comprising:
program instructions, stored on the one or more computer-readable, tangible storage devices for execution by at least one of the one or more processors via the at least one of the one or more memories, to display an interface configured to activate a session counter, to receive a session number, to receive a block number, and to receive an inactive number;
program instructions, stored on the one or more computer-readable, tangible storage devices for execution by at least one of the one or more processors via the at least one of the one or more memories, to queue, responsive to a first incoming session causing a first count number to equal or exceed the session number, the first incoming session;
program instructions, stored on the one or more computer-readable, tangible storage devices for execution by at least one of the one or more processors via the at least one of the one or more memories, to block, responsive to a second incoming session causing a second count number to equal or exceed the block number, the second incoming session; and
program instructions, stored on the one or more computer-readable, tangible storage devices for execution by at least one of the one or more processors via the at least one of the one or more memories, to close, responsive to determining that an elapsed period of time equals or exceeds the inactive number, a session associated with the elapsed period of time.

11. A computer program product for managing multiple messaging sessions, the computer program product comprising:
one or more computer-readable, tangible storage devices; and
program instructions, stored on at least one of the one or more computer-readable, tangible storage devices to display a first identifier of a remote user followed by a first numeral and a second numeral for a local user, wherein the first numeral represents a number of messaging active sessions for the remote user;
wherein, if the local user has not sent a message to the remote user, the second numeral represents a number of messages to be delivered to the remote user and that are present in a queue used by the remote user;
wherein, if the local user has sent a message to the remote user and the message is present in the queue, the second numeral represents a position in the queue of the message sent by the local user.

12. The computer program product of claim 11 further comprising:
program instructions, stored on at least one of the one or more computer-readable, tangible storage devices to receive a message having a second identifier of a remote user in a messaging session; and program instructions, stored on at least one of the one or more computer-readable, tangible storage devices to reject, responsive to determining that the second identifier matches a third identifier in a list, the message having the second identifier.

13. The computer program product of claim 11 further comprising:

program instructions, stored on at least one of the one or more computer-readable, tangible storage devices to receive a message from the remote user in a messaging session;

program instructions, stored on at least one of the one or more computer-readable, tangible storage devices to determine a number of active messaging sessions for the local user;

program instructions, stored on at least one of the one or more computer-readable, tangible storage devices to block, responsive to the number of active messaging sessions for the local user being equal to or greater than a pre-designated number, the message from the remote user; and program instructions, stored on at least one of the one or more computer-readable, tangible storage devices to send data comprising the number of active messaging sessions for the local user and a number of messages present in a queue used by the local user and waiting to be delivered to the local user.

14. The computer program product of claim 11 further comprising:

program instructions, stored on at least one of the one or more computer-readable, tangible storage devices to receive a message to the local user in a messaging session;

program instructions, stored on at least one of the one or more computer-readable, tangible storage devices to determine a number of active messaging sessions for the local user; and program instructions, stored on at least one of the one or more computer-readable, tangible storage devices to display, responsive to the number of active messaging sessions for the local user being less than a pre-designated number, the message to the local user.

15. The computer program product of claim 11 further comprising:

program instructions, stored on at least one of the one or more computer-readable, tangible storage devices to activate a session counter, to receive a session number, to receive a block number, and to receive an inactive number;

program instructions, stored on at least one of the one or more computer-readable, tangible storage devices to queue, responsive to a first incoming session causing a first count number to equal or exceed the session number, the first incoming session;

program instructions, stored on at least one of the one or more computer-readable, tangible storage devices to block, responsive to a second incoming session causing a second count number to equal or exceed the block number, the second incoming session; and program instructions, stored on at least one of the one or more computer-readable, tangible storage devices to close, responsive to determining that an elapsed period of time equals or exceeds the inactive number, a session associated with the inactive number.

16. A computer system comprising one or more processors, one or more computer-readable memories, one or more computer-readable tangible storage devices, and program instructions which are stored on the one or more computer-readable tangible storage devices for execution by the one or more processors via the one or more computer-readable memories and when executed by the one or more processors perform the method of claim 1.

17. A computer program product comprising one or more computer-readable tangible storage devices and computer-readable program instructions which are stored on the one or more computer-readable tangible storage devices and when executed by one or more processors perform the method of claim 1.

18. The method according to claim 1, further comprising the step of:

responsive to the computer detecting that a cursor is placed over the second numeral, the computer displaying identities of users in the active messaging sessions.

19. The method according to claim 1, further comprising the step of:

responsive to the computer detecting that a cursor is placed over the second numeral, the computer displaying identities of users that sent the messages that are present in the queue.

* * * * *